United States Patent
Sakai et al.

(10) Patent No.: US 7,920,791 B2
(45) Date of Patent: Apr. 5, 2011

(54) PASSIVE OPTICAL NETWORK SYSTEM AND METHOD OF DATA TRANSMISSION IN THE PASSIVE OPTICAL NETWORK

(75) Inventors: Yoshio Sakai, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 12/073,037

(22) Filed: Feb. 28, 2008

(65) Prior Publication Data
US 2008/0226294 A1 Sep. 18, 2008

(30) Foreign Application Priority Data

Mar. 15, 2007 (JP) ................................ 2007-066652

(51) Int. Cl.
*H04J 14/00* (2006.01)
(52) U.S. Cl. ................. 398/66; 398/63; 398/98; 398/99; 398/100; 398/101; 398/102
(58) Field of Classification Search .................... 398/63, 398/66, 98–102
See application file for complete search history.

(56) References Cited

U.S. PATENT DOCUMENTS

| 7,653,312 B2 * | 1/2010 | Mori | 398/100 |
| 2005/0069318 A1 * | 3/2005 | Lee et al. | 398/67 |
| 2006/0133809 A1 * | 6/2006 | Chow et al. | 398/66 |
| 2008/0002977 A1 * | 1/2008 | Mori | 398/71 |

FOREIGN PATENT DOCUMENTS

JP 2005-033537 2/2005

\* cited by examiner

*Primary Examiner* — Li Liu
(74) *Attorney, Agent, or Firm* — Staas & Halsey LLP

(57) ABSTRACT

Regarding the passive optical network (PON) system of the present invention, in an OLT, data of different bit rates is framed, and framed data rows are subjected to FEC encoding processing without changing the line up of the data, and a check bit is added to the end of the frame, and an optical signal that has been modulated in accordance with the data row to which the check bit has been added is transmitted to the optical transmission line. Then in an ONU that corresponds to a high speed bit rate to which an optical signal from the OLT has been applied via a power splitter, forward error correction of the reception data is performed. As a result in a PON system in which data of different bit rates coexist, the minimum reception rate of a high speed ONU can be improved without having an influence on a low speed ONU.

7 Claims, 6 Drawing Sheets

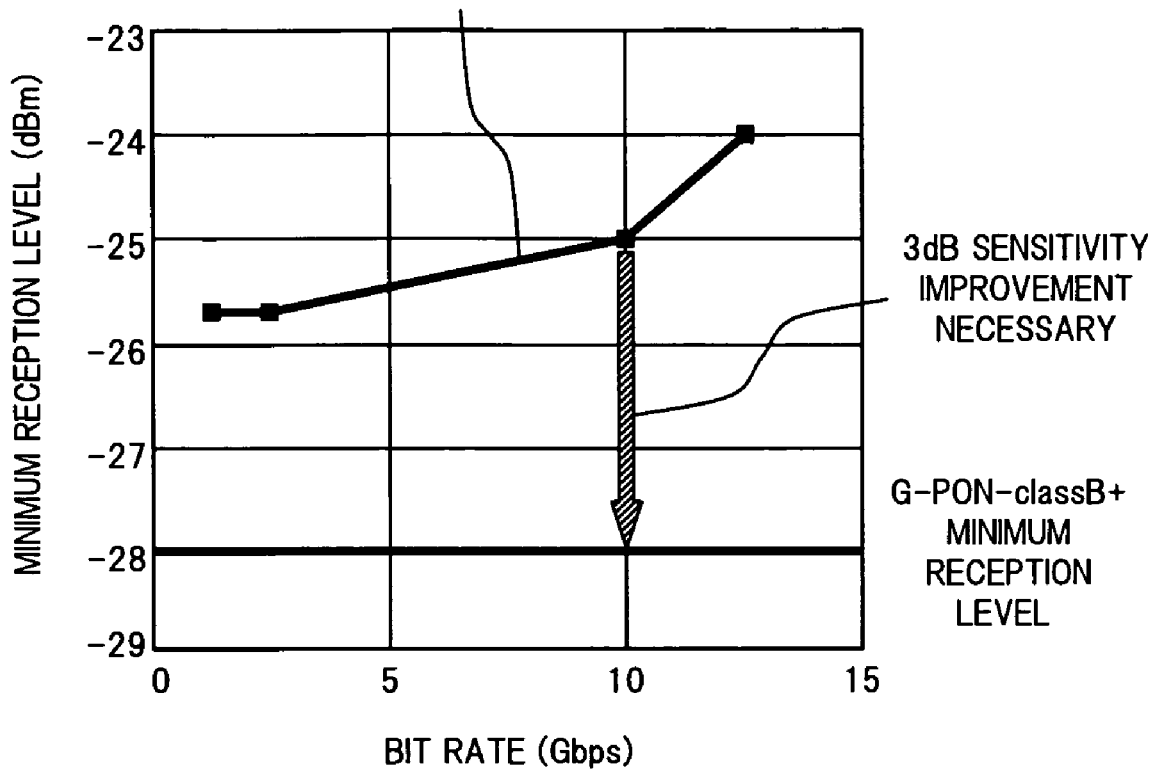

PASSIVE OPTICAL NETWORK SYSTEM AND METHOD OF DATA TRANSMISSION IN THE PASSIVE OPTICAL NETWORK

BACKGROUND OF THE INVENTION

1. Field of the Invention

The present invention relates to an optical network system the adopts a passive optical network (PON) in which data of different bit rates coexist, and a method of data transmission in the passive optical network.

2. Description of the Related Art

Currently as a subscriber loop optical fiber network system in which premises such as general households are the object, there is known for example a system in which an optical line terminal (station) provided on an aggregated station arranged on a telephone station or the like, and an optical network unit arranged on a plurality of subscriber households, are connected by a transmission line using an optical fiber. Amongst these, a configuration that branches an optical signal transmitted from an aggregated station to an optical transmission line into a plurality of optical signals by a power splitter being a passive element, and connects the optical network unit of each of the premises to the branch target, is called a passive optical network (PON) system.

This PON system is utilized as a system capable of receiving data at high speed between the optical line terminal and the plurality of optical network units. Furthermore, as one form of a transmission network which uses the PON system, there is the system configuration as shown for example in FIG. 6. This comprises an optical line terminal (OLT) 110, N (where N is an integer of two or more) optical network units (ONU) 120-1 to 120-N corresponding to the respective subscribers, optical transmission lines 101 and 101-1 to 101-N connecting between each of these, and a power splitter 102.

The OLT 110 is of a configuration furnished with a necessary transmission control function which, in order to perform information distribution and the like, converts an electrical signal into an optical signal and transmits this to the respective ONUs 120-1 to 120-N in a predetermined frame format, or converts data that has been sent as an optical signal of a predetermined frame format from the respective ONUs 120-1 to 120-N into an electrical signal. Furthermore, the respective ONUs 120-1 to 120-N are configured to perform communication control such as communication with the OLT 110, and conversion between an optical signal and an electrical signal.

Here, between the OLT 110 and the power splitter 102, the upstream and downstream data transmission uses a single optical transmission line 101 and performs communication in both directions by wavelength division multiplexing (WDM). The direction from the OLT 110 to the respective ONUs 120-1 to 120-N is the downstream direction, and the direction from the respective ONUs 120-1 to 120-N to the OLT 110 is the upstream direction. For example, the downstream frame from the OLT 110 to the respective ONUs 120-1 to 120-N is transmitted at a single bit rate as an optical signal of 1.49 □m by time division multiplexing (TDM). In the respective ONUs 120-1 to 120-N, the frame synchronization information and the administrative information in the downstream frame are detected, and based on this, the data for the time slot which is individually assigned beforehand is taken out. On the other hand, in the upstream frame from the respective ONUs 120-1 to 120-N to the OLT 110, this is transmitted from the respective ONUs 120-1 to 120-N at a timing which is given by the OLT 110. That is to say, in the upstream frame 110 from the respective ONUs 120-1 to 120-N, this is transmitted as an optical signal of 1.31 □m band by a time division multiple access (TDMA) method at a timing at which these do not collide.

The power splitter 102 distributes (power splits) the downstream frame from the single optical transmission line 101 to a plurality of optical transmission lines 110-1 to 110-N. Furthermore, it serves the role of aggregating (combining) the upstream frame from the plurality of optical transmission lines 101-1 to 101-N to a single optical transmission line 101.

Incidentally, regarding the above such PON system, in general, use with the purpose of providing a low speed service of a telephone level has been examined. However recently, rather than a telephone service, it is necessary to provide a high speed communication service of a high speed video telephone service or video conferencing service and the like, and there is a demand to provide data of a low speed bit rate (for example a low speed service of a telephone or the like), and data of a high speed bit rate (for example a high speed service of a video telephone service or a vide conferencing service, or the like), on a single PON system.

As a conventional technique for realizing a PON system in which such data of different bit rates coexist, for example in Japanese Unexamined Patent Publication No. 2005-33537 there is disclosed a method in which the upstream direction communication frame comprises a plurality of burst slots having the same duration, and the respective ONUs send a number of data cells corresponding to each of the burst rates, with respect to the burst slots specified by a control cell from the OLT, and the upstream direction communication frame transports data cells at different bit rates depending on the burst slot position.

In the conventional PON system as described above, for example in the case where an ONU that corresponds to data of a high speed bit rate is newly added to an existing PON system that corresponds to data of a low speed bit rate, it is necessary for the ONU that corresponds to the high speed bit rate to satisfy the level diagram of the existing system, and also this must not have an influence on the data transmission of the existing system. For example, in a G-PON_Class_B+ specified by ITU-T_G.984.2, since the minimum reception rate is −28 dBm, it is necessary for the ONU that corresponds to the newly added high speed bit rate to also maintain a minimum reception rate of −28 dBm.

However, for the ONU that corresponds to the high speed bit rate, since the band width is wide, this is susceptible to influence of noise, and compared to the ONU that corresponds to the low speed bit rate, receiver sensitivity is poor. For example, as shown in FIG. 7, the minimum reception level for the bit rate of the ONU that corresponds to 10 gigabits per second (Gbps) is only around −25 dBm at 10 Gbps. Therefore, if an ONU that corresponds to 10 Gbps is added to an existing system that corresponds to a bit rate of 2.5 Gbps or the like, then in the ONU that corresponds to 10 Gbps it becomes difficult to ensure a minimum reception rate of −28 dBm specified by the aforementioned G-PON_Class_B+, and a problem arises in that the level diagram of the existing system cannot be satisfied. In order to satisfy the level diagram of the existing system, it is necessary to improve the receiver sensitivity of the ONU that corresponds to 10 Gbps to 3 dB or more, without having an influence on the reception processing of the data in the ONU that corresponds to 2.5 Gbps.

SUMMARY OF THE INVENTION

The present invention addresses the above mentioned points, with an object of providing a technique that can improve the minimum reception level of an ONU that corresponds to a high speed bit rate without having an influence on an ONU that corresponds to a low speed bit rate, in a PON system in which data of different bit rates coexists.

In order to achieve the above object, the passive optical network system of the present invention comprises: an optical line terminal that generates an optical signal of a predetermined frame format that includes a header field, and a data field in which data of a first bit rate and data of a second bit rate of a higher speed than the first bit rate are arrayed, and transmits the optical signal to an optical transmission line; at lease one first optical network unit that corresponds to the first bit rate; at least one second optical network unit that corresponds to the second bit rate; and a branching device that branches an optical signal transmitted from the optical line terminal to the optical transmission line, and respectively applies this to the first and second optical network units.

Furthermore, the optical line terminal has: a framing processing section that frames data of the first bit rate and data of the second bit rate in accordance with the frame format; an FEC encoding processing section that encoding processes a data row that has been framed by the framing processing section using a predetermined forward error correction without changing the array of this data and computes a check bit, and adds the check bit to a position previously set inside the frame; and an electric/optic converting section that generates an optical signal modulated in accordance with a data row to which the check bit has been added in the FEC encoding processing section, and transmits the optical signal to the optical transmission line.

Furthermore, the first optical network unit has: a first optic/electric converting section that converts an optical signal from the branching device into an electrical signal, and generates a data row corresponding to the first bit rate; a first header processing section that regenerates a header from the data row that has been generated by the first optic/electric converting section; and a first reception processing section that reception processes data addressed to self-unit which is included in the data row generated by the first optic/electric converting section, in accordance with contents of the header that has been regenerated by the first header processing section.

Furthermore, the second optical network unit has: a second optic/electric converting section that converts an optical signal from the branching device into an electrical signal, and generates a data row corresponding to the second bit rate; an FEC decoding processing section that performs forward error correction processing on the data row generated by the second optic/electric converting section; a second header processing section that speed converts the data row that has been subjected to forward error correction processing in the FEC decoding processing section into a data row corresponding to the first bit rate, and regenerates a header from the data row; and a second reception processing section that reception processes data addressed to self-unit which is included in the data row that has been subjected to forward error correction processing in the FEC decoding processing section, in accordance with contents of the header that has been regenerated by the second header processing section.

In the passive optical network system as described above, in the optical line terminal, the downstream optical signal which has been subjected to FEC encoding processing in the optical line terminal, and to which has been added the check bit, is transmitted to the optical transmission line, and the downstream optical signal is respectively received in the first and second optical network units via the branching device. In the second optical network unit on the high speed side, by performing forward error correction processing of the received data row, an improvement in the receiver sensitivity that was deficient compared to the first optical network unit on the low speed side, is achieved. Furthermore, before and after encoding processing of the FEC in the optical line terminal, without changing the data array inside the frame, the check bit of the FEC is added to the position previously set inside the frame. Therefore the reception processing of the data in the first optical network unit on the low speed side is not influenced by performing encoding processing of the FEC in the optical line terminal.

Accordingly to the present invention as described above, the receiver sensitivity of the second optical network unit on the high speed side can be improved without having an influence on the reception processing of the data in the first optical network unit on the low speed side. Consequently, a predetermined level diagram can be satisfied, and it is possible to realize a passive optical network system in which data of different bit rates coexists.

Other objects features and advantages of the present invention will become apparent from the following description of the embodiments in conjunction with the appended drawing.

BRIEF DESCRIPTION OF THE DRAWING

FIG. 7 is a diagram showing an example of a minimum reception level of a 10 G_ONU in the conventional PON system.

DETAILED DESCRIPTION OF THE INVENTION

Hereunder is a description of a best mode for carrying out the present invention, with reference to the appended drawings.

Figure 1:
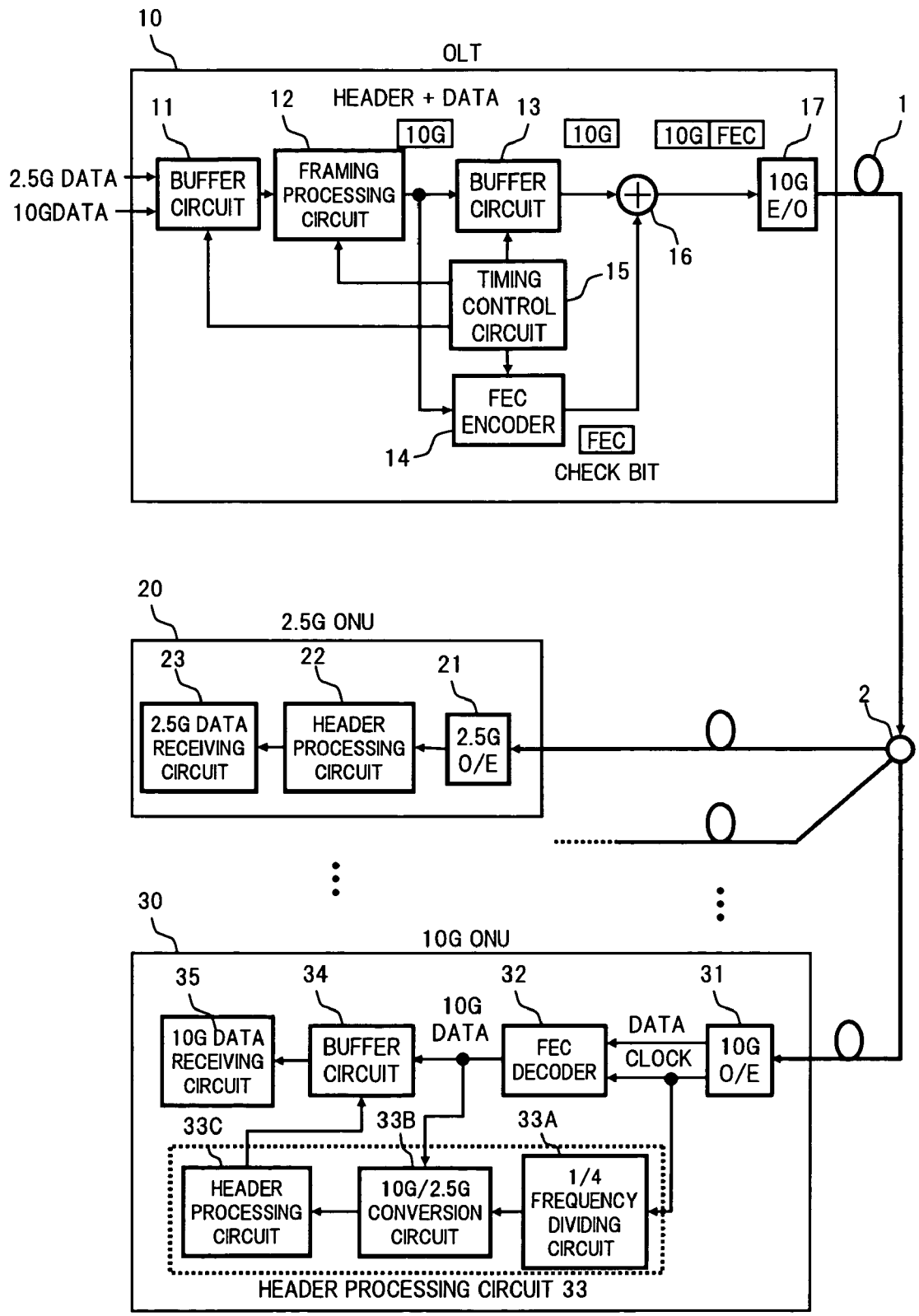
FIG. 1 is a block diagram showing a configuration of a PON system, according to a first embodiment of present invention.

FIG. 1 is a block diagram showing a configuration of a PON system, according to a first embodiment of the present invention.

In FIG. 1, the PON system comprises for example: an optical line terminal (OLT) 10 provided on an aggregated station; an optical network unit (ONU) 20 that corresponds to data of 2.5 Gbps and an ONU 30 that corresponds to data of 10 Gbps, arranged respectively corresponding to a plurality of subscribers; an optical transmission line 1 that connects between the OLT 10 and the respective ONUs 20 and 30, and a power splitter 2.

In FIG. 1 is shown a configuration corresponding to data transmission in the downstream direction from the OLT 10 to the respective ONUs 20 and 30. A configuration corresponding to data transmission in an upstream direction from the respective ONUs 20 and 30 towards the OLT 10 is basically similar to the case of the conventional PON system, and hence is omitted. In the following, the description centers on the contents related to data transmission in the downstream direction. Furthermore, in the following description, the ONU 20 that corresponds to data of 2.5 Gbps, is abbreviated to "2.5 G_ONU 20", and ONU 30 that corresponds to data of 10 Gbps is abbreviated to "10 G_ONU 30".

The OLT 10 includes a transmission section that outputs a downstream optical signal of 10 Gbps to the optical transmission line 1. The transmission section has for example buffer circuits 11 and 13, a framing processing circuit 12, an FEC encoder 14, a timing control circuit 15, an adder circuit 16, and an electric/optic conversion element (10 G_E/O) 17.

The buffer circuit 11 temporarily holds a data signal (2.5 G data) of 2.5 Gbps input from the outside, and a data signal (10 G data) of 10 Gbps, and outputs the held respective data signals to the frame processing circuit 12 in accordance with an output signal from the timing control circuit 15. The framing processing circuit 12 framing processes the 2.5 G data and the 10 G data output at a necessary timing from the buffer circuit 11, corresponding to a basic frame comprising a header field, a 2.5 G data field, and a 10 G data field. In the above mentioned header field is stored a header of 2.5 Gbps showing the administrative information of the concerned frame. Then the framed data rows are respectively sent to the buffer circuit 13 and the FEC encoder 14.

The buffer circuit 13 temporarily stores the data row output from the framing processing circuit 12, and outputs the stored data row to the adder circuit 16 in accordance with an output signal from the timing control circuit 15. The FEC encoder 14 regards the data row output from the framing processing circuit 12 as one where the whole is a 10 Gbps data row without changing the array thereof, and computes a FEC check bit for performing encoding processing using a necessary forward error correction (FEC) signal, and outputs the check bit to the adder circuit 16. The timing control circuit 15 generates a control signal for synchronizing the respective operations of the buffer circuits 11 and 13, the framing processing circuit 12, and the FEC encoder 14, and outputs the control signal to each of these.

The adder circuit 16, with respect to the data row output from the buffer circuit 13, adds the check bit output from the FEC encoder 14 for example to an end of one frame and output this. The 10 G_E/O 17 generates an optical signal that has been modulated in accordance with the data row to which the check bit has been added by the adder circuit 16, and transmits the optical signal to the optical transmission line 1 as downstream transmission data of 10 Gbps.

The power splitter 2 power splits the downstream optical signal that has been transmitted from the OLT 10 to the optical transmission line 1, into a plurality of optical signals, and respectively distributes these to the 2.5 G_ONU 20 and the 10 G_ONU 30.

The 2.5 G_ONU 20 includes a receiving section that receives the optical signal that has been transmitted from the OLT 10 in the downstream direction via the optical transmission line 1 and the power splitter 2. The receiving section has for example an optic/electric conversion element (2.5 G_O/E) 21, a header processing circuit 22, and a 2.5 G data receiving circuit 23.

The 2.5 G_O/E 21 converts the optical signal that has been power split by the power splitter 2 into an electrical signal, and outputs reception data corresponding to 2.5 Gbps. The header processing circuit 22 regenerates a header included in the reception data output from the 2.5 G_O/E 21. The 2.5 G data receiving circuit 23 performs reception processing of the 2.5 G data addressed to self-unit, in accordance with to the contents of the header regenerated by the header processing circuit 22.

The 10 G_ONU 30 includes a receiving section that receives the optical signal that has been transmitted from the OLT 10 in the downstream direction via the optical transmission line 1 and the power splitter 2. The receiving section has for example an optic/electric conversion element (10 G_O/E) 31, an FEC decoder 32, a header processing circuit 33, a buffer circuit 34, and a 10 G data receiving circuit 35.

The 10 G_O/E 31 converts the optical signal power that has been split by the power splitter 2 into an electrical signal, and generates a data and clock corresponding to 10 Gbps. The data generated by the 10 G_O/E 31 is output to the FEC decoder 32, and the clock is output to the FEC decoder 32 and the header processing circuit 33. The FEC decoder 32 performs decoding processing of the FEC using the 10 G data and the clock from the 10 G_O/E 31, and outputs forward error corrected 10 G data (including header and data) to the header processing circuit 33 and the buffer circuit 34.

The header processing circuit 33 comprises for example a ¼ frequency dividing circuit 33A, a 10 G/2.5 G conversion circuit 33B, and a header processing circuit 33C. The ¼ frequency dividing circuit 33A divides the clock that corresponds to 10 Gbps sent from the 10 G_O/E 31 into four frequencies, and outputs these to the 10 G/2.5 G conversion circuit 33B. The 10 G/2.5 G conversion circuit 33B uses the clock divided into four frequencies by the ¼ frequency dividing circuit 33A to speed convert the 10 G data sent from the FEC decoder 32, to thereby make a refreshable data row with the header part included in the 10 G data as 2.5 Gbps. The header processing circuit 33C extracts the header part from the data row that has been converted to 2.5 Gbps by the 10 G/2.5 G conversion circuit 33B and performs regeneration processing of the header.

The buffer circuit 34 maintains the 10 G data from the FEC decoder 32, and outputs the 10 G data addressed to self-unit to the 10 G data receiving circuit 35 in accordance with an enable signal output from the header processing circuit 33C corresponding to the contents of the header that has been regenerated by the header processing circuit 33C. The 10 G data receiving circuit 35 performs reception processing of the 10 G data output from the buffer circuit 34.

Next is a description of the operation of the present embodiment.

In the PON system of the above described configuration, for example considering the case where the 10 G_ONU 30 is added to the existing system that corresponds to 2.5 Gbps, then regarding the aforementioned deficiency of the receiver sensitivity of the 10 G_ONU 30 such as shown in the FIG. 7, the optical signal that has been subjected to FEC encoding processing is transmitted from the OLT 10 to the 10 G_ONU 30, and by performing FEC decoding processing in the 10 G_ONU 30, the deficient part of the receiver sensitivity is compensated. At this time, there is no influence on the existing 2.5 G_ONU 20. That is to say, since reception processing similar to before adding the 10 G_ONU 30 becomes possible with the 2.5 G_ONU 20, then the FEC check bit is added to the end of the frame before and after the FEC encoding processing in the OLT 10, without changing the line up of the data part inside the frame. As a result, regarding the data row that the 2.5 G_ONU 20 must read, since the line up is the same as for the existing frame, then even after adding the 10 G_ONU 30, reception processing of the 2.5 G data is possible in the same manner as before adding this.

Figure 2:
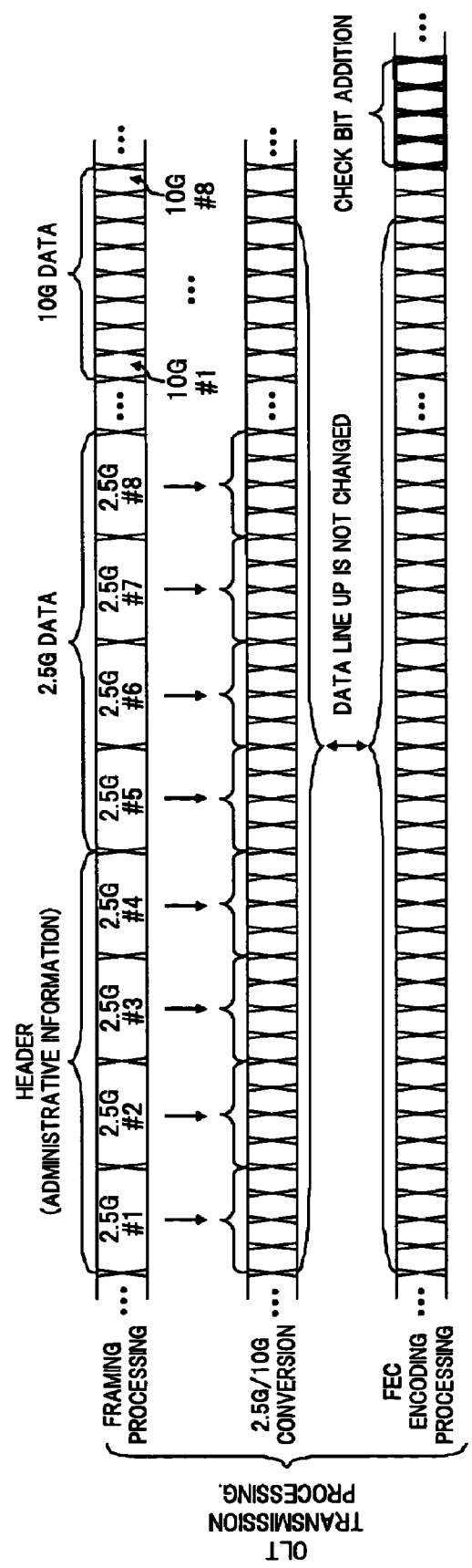
FIG. 2 is a diagram for explaining a process in an OLT in the above embodiment.

If the data transmission method in the downstream direction for the above described PON system is specifically described respectively corresponding to the OLT 10, the 2.5 G_ONU 20, and the 10 G_ONU 30, at first in the OLT 10, the 2.5 G data and the 10 G data applied to the framing processing circuit 12 via the buffer circuit 11, as shown for example at the top part of FIG. 2, is framing processed to the basic frame comprising; the header (administrative information) made up of the 2.5 G cells #1 to #4, the 2.5 G data made up of the 2.5 G cells #5 to #8, and the 10 G data made up of the 10 G cells #1 to #8. Regarding the data row which has been framing processed in this manner, as shown at the middle of FIG. 2, by dividing each of the respective 2.5 G cells #1 to #8 into four and handling these, the overall frame can be made into a data row of 10 Gbps. Then, in the FEC encoder 14, FEC encoding processing is performed without changing the arrangement of the data row of 10 Gbps, and the check bit, as shown at the bottom of FIG. 2, is added to the end of the 1 frame. By driving the 10 G_E/O 17 in accordance with the data row to which the check bit has been added, the downstream optical signal directed to the 2.5 G_ONU 20 and the 10 G_ONU 30 is transmitted to the optical transmission line 1.

Figure 3:
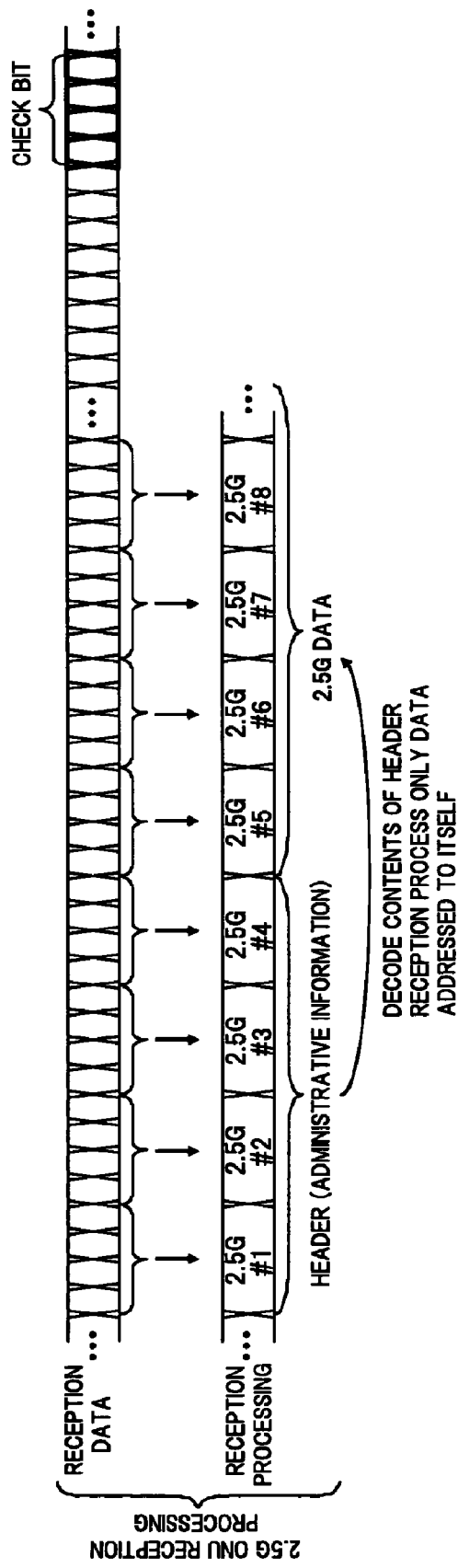
FIG. 3 is a diagram for explaining a process in a 2.5 G_ONU in the above embodiment.

In the 2.5 G_ONU 20, the data row of 10 Gbps as shown at the top of FIG. 3 is received by the 2.5 G_O/E 21. Since this received data is the same as that where the data array inside the frame exists, then as shown at the bottom of FIG. 3, by processing the four 10 G cells as one 2.5 G cell, the 2.5 G cells #1 to #4 corresponding to the header, and the 2.5 G cells #5 to #8 corresponding to the 2.5 G data can be regenerated. Consequently, in the 2.5 G_ONU 20, this is not influenced due to the addition of the 10 G_ONU 30, and only the 2.5 G data addressed to self-unit is reception processed in accordance with the contents of the regenerated header.

Figure 4:
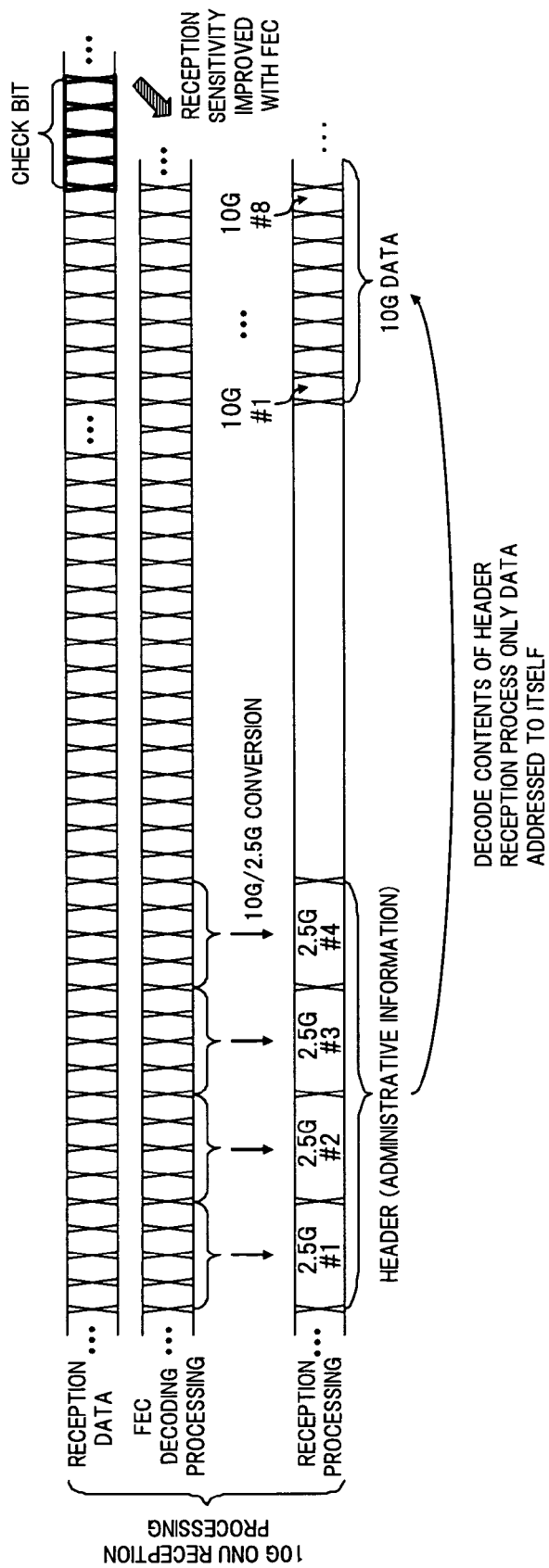
FIG. 4 is a diagram for explaining a process in a 10 G_ONU in the above embodiment.

In the 10 G_ONU 30 however, the data row of 10 Gbps as shown at the top of FIG. 4 is received by the 10 G_O/E 31. This received data is applied to the FEC decoder 32, and as shown at the middle of FIG. 4, by performing FEC decoding processing, an improvement in receiver sensitivity due to the effect of forward error correction is achieved. Furthermore, in regenerating the header included in the reception data, it is necessary to process the header part as data of 2.5 Gbps. Therefore here the data row output from the FEC decoder 32 is applied to the 10 G/2.5 G conversion circuit 33B of the separate header processing section 33. In the 10 G/2.5 G conversion circuit 33B, using the clock that has been divided into four frequencies by the ¼ frequency dividing circuit 33A, then as shown at the bottom of FIG. 4, conversion processing is performed to make the four 10 G cells into one 2.5 G cell. As a result, regeneration processing of the 2.5 G cells #1 to #4 corresponding to the header is possible, and by outputting an enable signal from the header processing circuit 33 to the buffer circuit 34 in accordance with the contents of the regenerated header, only the 10 G data addressed to self-unit is reception processed by the 10 G data receiving circuit 35.

According to the PON system of the present embodiment as described above, the downstream optical signal that has been subjected to FEC encoding processing is transmitted from the OLT 10, and by performing FEC decoding processing in the 10 G_ONU 30 that has received this optical signal, it is possible to improve the receiver sensitivity of the 10 G_ONU 30 that was deficient compared to the 2.5 G_ONU 20.

Figure 5:
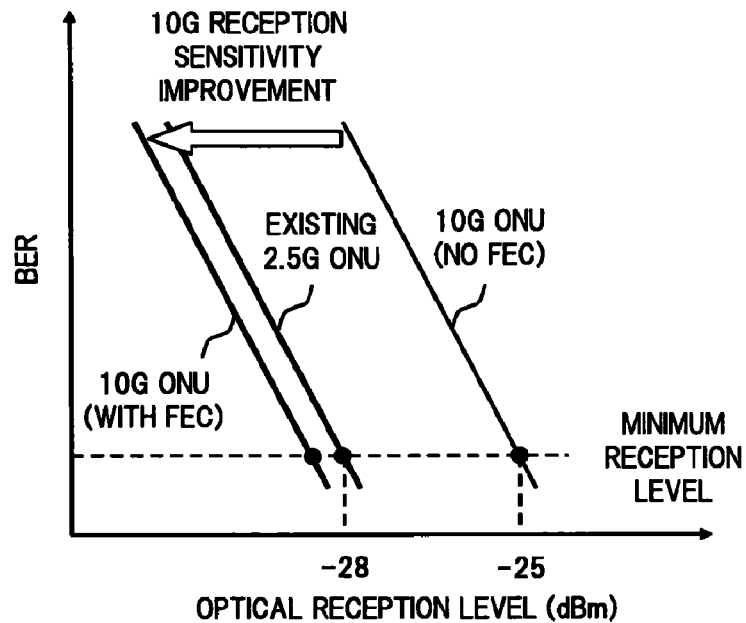
FIG. 5 is a diagram showing an improvement result of receiver sensitivity due to FEC in the above embodiment.
Figure 6:
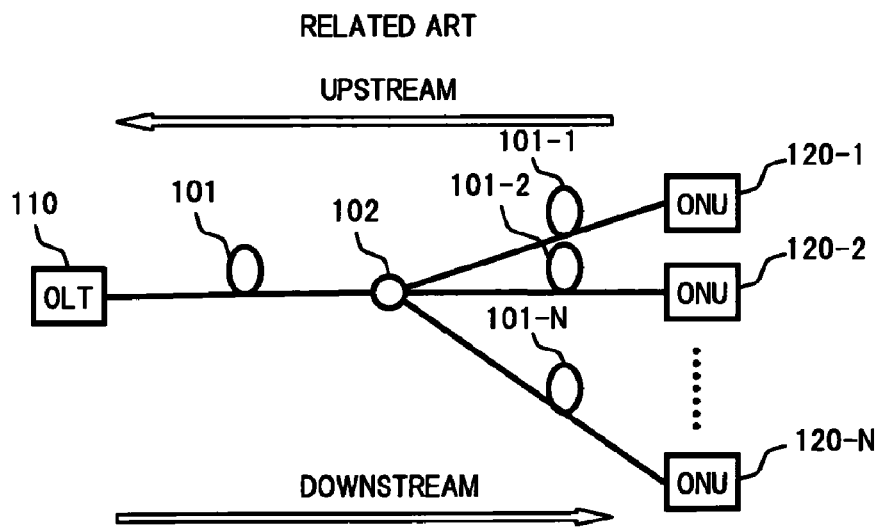
FIG. 6 is a block diagram showing a configuration example of a conventional PON system.

FIG. 5 is an example showing an improvement result of receiver sensitivity of the 10 G_ONU due to FEC. In this example, the minimum reception level of the 10 G_ONU 30 which is around −25 dBm in the case of no FEC, is reduced to near −28 dBm by having FEC, and an improvement result of receiver sensitivity of around 3 db is obtained.

Furthermore, since the FEC check bit is added to the end of the frame without changing the data array inside the frame before and after the FEC encoding processing in the OLT 10, it is possible to improve the receiver sensitivity of the 10 G_ONU 30 without having an influence on the 2.5 G_ONU 20. Consequently, a minimum reception level (−28 dBm) of G-PON_Class_B+ can be ensured, and it is possible to realize a PON system in which data of 2.5 Gbps and 10 Gbps coexists.

In the above embodiment, an example is shown for the case where, as data of different bit rates, data of 2.5 Gbps and data of 10 Gbps coexists. However the bit rate of the data in the present invention is not limited to the abovementioned example, and if the bit rate of the data on the high speed side and the bit rate of the data on the low speed side is made an integral multiple, it is possible to adopt a data transmission method similar to the case of the abovementioned embodiment. Furthermore, even in the case where the bit rate of the data on the high speed side does not become an integral multiple of the bit rate of the data on the low speed side, by subjecting the bit rate of the data on the high speed side to processing to make this an integral multiple of the bit rate of the data on the low speed side by speed conversion, it is possible to apply the present invention.

Moreover, in the above described embodiment, the example is shown where the FEC check bit is added to the end of the frame. However, with respect to the position for adding the check bit, this can be an optional position within the frame where there is no influence on the reception processing in the ONU on the low speed side.

What is claimed is:

1. A passive optical network system comprising:
an optical line terminal that generates an optical signal of a predetermined frame format that includes a header field, and a data field in which data of a first bit rate and data of a second bit rate of a higher speed than the first bit rate are arrayed, and transmits the optical signal to an optical transmission line;
at least one first optical network unit that corresponds to the first bit rate;
at least one second optical network unit that corresponds to the second bit rate; and
a branching device that branches an optical signal transmitted from the optical line terminal to the optical transmission line, and respectively applies this to the first and second optical network units, wherein
the optical line terminal has:
a framing processing section that frames data of the first bit rate and data of the second bit rate in accordance with the frame format;
an FEC encoding processing section that encoding processes a data row that has been framed by the framing processing section using a predetermined forward error correction without changing the array of this data and computes a check bit, and adds the check bit to a position previously set inside the frame; and
an electric/optic converting section that generates an optical signal modulated in accordance with a data row to which the check bit has been added in the FEC encoding processing section, and transmits the optical signal to the optical transmission line,
the first optical network unit has:
a first optic/electric converting section that converts an optical signal from the branching device into an electrical signal, and generates a data row corresponding to the first bit rate;
a first header processing section that regenerates a header from the data row that has been generated by the first optic/electric converting section; and
a first reception processing section that reception processes data addressed to self-unit which is included in the data row generated by the first optic/electric converting section, in accordance with contents of the header that has been regenerated by the first header processing section; and the second optical network unit has:

a second optic/electric converting section that converts an optical signal from the branching device into an electrical signal, and generates a data row corresponding to the second bit rate;

an FEC decoding processing section that performs forward error correction processing on the data row generated by the second optic/electric converting section;

a second header processing section that speed converts the data row that has been subjected to forward error correction processing in the FEC decoding processing section into a data row corresponding to the first bit rate, and regenerates a header from the data row; and a second reception processing section that reception processes data addressed to self-unit which is included in the data row that has been subjected to forward error correction processing in the FEC decoding processing section, in accordance with contents of the header that has been regenerated by the second header processing section.

2. A passive optical network system according to claim 1, wherein the second bit rate is an integral multiple of the first bit rate.

3. A passive optical network system according to claim 2, wherein the first bit rate is 2.5 Gbps, and the second bit rate is 10 Gbps.

4. A passive optical network system according to claim 1, wherein
when the second bit rate differs from an integral multiple of the first bit rate,
the optical line terminal speed converts data of the second bit rate into data of an integral multiple of the first bit rate, and applies the speed converted data to the framing processing section.

5. A passive optical network system according to claim 1, wherein
the FEC encoding processing section adds the check bit to an end of the frame.

6. A passive optical network system according to claim 1, wherein:
the second optic/electric converting section outputs a data row corresponding to the second bit rate and a clock corresponding second bit rate, and
the second header processing section has: a frequency dividing circuit that frequency divides the clock output from the second optic/electric converting section, and outputs a clock corresponding to the first bit rate; a speed converting circuit that speed converts the data row that has been subjected to forward error correction processing by the FEC decoding processing section into a data row corresponding to the first bit rate, using the clock output from the frequency dividing circuit; and a header processing circuit that regenerates a header from the data row that has been speed converted by the speed converting circuit.

7. A method of data transmission in a passive optical network that transmits an optical signal of a predetermined frame format that includes a header field, and a data field in which data of a first bit rate and data of a second bit rate of a higher speed than the first bit rate are arrayed, from an optical line terminal to an optical transmission line, and branches an optical signal transmitted on the optical transmission line into a plurality of optical signals in a branching device, and applies the branched optical signals to each of at lease one first optical network unit that corresponds to the first bit rate, and at least one second optical network unit that corresponds to the second bit rate; the method comprising, in the optical line terminal:
framing data of the first bit rate and data of the second bit rate in accordance with the frame format;
encoding processing the data row that has been framed using a predetermined forward error correction without changing the array of this data and computing a check bit, and adding the check bit to a position previously set inside the frame; and
generating an optical signal modulated in accordance with the data row to which the check bit has been added, and transmitting the optical signal to the optical transmission line, in the first optical network unit:
converting an optical signal from the branching device into an electrical signal, and generating a data row corresponding to a first bit rate;
regenerating a header from the generated data row, and
reception processing data addressed to self-unit which is included in the data row, in accordance with contents of the regenerated header; and in the second optical network unit:
converting an optical signal from the branching device into an electrical signal, and generating a data row corresponding to a second bit rate;
performing forward error correction processing on the generated data row;
speed converting the data row that has been subjected to forward error correction processing into a data row corresponding to the first bit rate, and regenerating a header from the data row; and
reception processing data addressed to self-unit which is included in the data row that has been subjected to forward error correction processing, in accordance with contents of the regenerated header.

* * * * *

UNITED STATES PATENT AND TRADEMARK OFFICE
CERTIFICATE OF CORRECTION

PATENT NO. : 7,920,791 B2  
APPLICATION NO. : 12/073037  
DATED : April 5, 2011  
INVENTOR(S) : Sakai et al.

It is certified that error appears in the above-identified patent and that said Letters Patent is hereby corrected as shown below:

Col. 10, Claim 7, Line 14, delete the word "lease" and insert the word --least--.

Signed and Sealed this  
Twenty-eighth Day of June, 2011

David J. Kappos  
*Director of the United States Patent and Trademark Office*